(12) United States Patent
Sasin et al.

(10) Patent No.: US 10,185,829 B2
(45) Date of Patent: Jan. 22, 2019

(54) BOOTSTRAPPING WITHOUT TRANSFERRING PRIVATE KEY

(71) Applicant: ARM Ltd, Cambridge (GB)

(72) Inventors: Szymon Sasin, Oulu (FI); Norbert David, Oulu (FI); Yongbeom Pak, Oulu (FI)

(73) Assignee: ARM Ltd, Cambridge (GB)

( * ) Notice: Subject to any disclaimer, the term of this patent is extended or adjusted under 35 U.S.C. 154(b) by 81 days.

(21) Appl. No.: 15/226,523

(22) Filed: Aug. 2, 2016

(65) Prior Publication Data

US 2017/0039373 A1    Feb. 9, 2017

(30) Foreign Application Priority Data

Aug. 3, 2015   (GB) .................................. 1513748.2

(51) Int. Cl.
*G06F 21/57*    (2013.01)
*G06F 21/44*    (2013.01)
(Continued)

(52) U.S. Cl.
CPC .......... *G06F 21/575* (2013.01); *G06F 9/4401* (2013.01); *G06F 21/44* (2013.01); *H04L 9/3268* (2013.01); *H04L 2209/805* (2013.01)

(58) Field of Classification Search
CPC ..... H04W 12/04; H04W 12/06; H04W 12/08; H04W 84/12; H04W 12/02; H04W 48/16; H04W 4/005; H04W 52/0216; H04W 52/0235; H04W 40/005; H04W 4/70; H04W 52/0277; H04W 76/046; H04W 76/27; H04W 80/04; H04W 88/12;
(Continued)

(56) References Cited

U.S. PATENT DOCUMENTS 5,349,643 A    2/1994   Cox et al.
5,872,968 A    2/1999   Knox et al.
(Continued)

FOREIGN PATENT DOCUMENTS

EP    2466791 A1    6/2012
GB    2533385 A     6/2016
(Continued)

OTHER PUBLICATIONS

"Public Key Infrastructures and Digital Certificates for the Internet of Things", Schukat et al, 26th Irish Signals and Systems Conference (ISSC), pp. 1-5, IEEE, Jun. 24-25, 2015.
(Continued)

*Primary Examiner* — Terrell S Johnson
(74) *Attorney, Agent, or Firm* — Patterson Thuente Pedersen, P.A.

(57) ABSTRACT

A machine implemented method of communication between server and remote device, the method comprising: determining an availability and address of the remote device on a network for communication with the server; obtaining a public key attributed to the remote device; signing the public key attributed to the remote device with a private key of the server and so generating a digitally signed certificate to verify the ownership of the public key as the remote device; and transmitting the digitally signed certificate to the remote device.

18 Claims, 7 Drawing Sheets

(51) Int. Cl.
*G06F 9/44* (2018.01)
*H04L 9/32* (2006.01)
*G06F 9/4401* (2018.01)

(58) Field of Classification Search
CPC ............ H04W 8/082; G06F 2221/2107; G06F 21/44; G06F 21/575; G06F 9/4401; H04L 9/0816; H04L 9/30; H04L 9/32; H04L 2209/805; H04L 9/3268; Y02B 60/50; C07K 14/415
See application file for complete search history.

(56) References Cited

U.S. PATENT DOCUMENTS

| | | | |
|---|---|---|---|
| 6,463,535 B1 | 10/2002 | Drews | |
| 7,363,514 B1 | 4/2008 | Behren | |
| 7,882,345 B1 | 2/2011 | Christensen | |
| 7,971,045 B1 | 6/2011 | Currid et al. | |
| 8,370,491 B1 | 2/2013 | Breau et al. | |
| 9,064,117 B1 | 6/2015 | Worsley | |
| 2005/0010758 A1* | 1/2005 | Landrock | G06F 21/645 713/156 |
| 2006/0075242 A1* | 4/2006 | Aissi | H04L 63/0823 713/176 |
| 2007/0220266 A1* | 9/2007 | Cooper | H04L 63/1416 713/176 |
| 2009/0129597 A1 | 5/2009 | Zimmer et al. | |
| 2009/0276620 A1 | 11/2009 | McCarron et al. | |
| 2012/0079031 A1 | 3/2012 | Matthews et al. | |
| 2013/0160094 A1 | 6/2013 | Luo | |
| 2014/0089652 A1 | 3/2014 | Cerri et al. | |
| 2014/0330952 A1 | 11/2014 | Starsinic et al. | |
| 2015/0071139 A1* | 3/2015 | Nix | H04W 4/70 370/311 |
| 2015/0296470 A1 | 10/2015 | Kim et al. | |
| 2015/0305008 A1 | 10/2015 | Kim et al. | |
| 2015/0358824 A1 | 12/2015 | Kim et al. | |
| 2016/0065556 A1 | 3/2016 | Sasin et al. | |
| 2016/0072808 A1 | 3/2016 | David et al. | |
| 2017/0039373 A1 | 2/2017 | Sasin et al. | |
| 2017/0041287 A1 | 2/2017 | Pak et al. | |

FOREIGN PATENT DOCUMENTS

| | | |
|---|---|---|
| KR | 20140113007 A | 9/2014 |
| WO | WO 2006/059195 A1 | 6/2006 |
| WO | WO 2009/141493 A1 | 11/2009 |
| WO | WO 2014/048236 A1 | 3/2014 |
| WO | WO 2014/069968 A1 | 5/2014 |
| WO | WO 2014/114354 A1 | 7/2014 |
| WO | WO 2014/182674 A1 | 11/2014 |
| WO | WO 2014/190177 A1 | 11/2014 |
| WO | WO 2015/042370 A1 | 3/2015 |
| WO | WO 2015/065913 A1 | 5/2015 |

OTHER PUBLICATIONS

"Security for IoT, An effective DTLS with public certificates", Panwar et al., 2015 International Conference on Advances in Computer Engineering and Applications (ICACEA), pp. 163-166, IEEE, Mar. 19-20, 2015.
Search Report dated Mar. 17, 2016 for GB Application No. 1513748.2, 7 pages.
Examination Report dated Jul. 12, 2018 for Application No. GB1806259.6, 6 pages.
Application and File history for U.S. Appl. No. 14/842,065, filed Sep. 1, 2015. Inventors: Sasin et al.
Application and File history for U.S. Appl. No. 15/218,902, filed Jul. 25, 2016. Inventors: Pak et al.
Search Report dated Mar. 17, 2016 for GB Application No. GB1513750.8, 6 pages.
Examination Report dated Nov. 10, 2017 for Application No. GB1513750.8, 3 pages.
Search Report dated Jan. 12, 2015 for GB Application No. 1415562.6, 5 pages.
"Lightweight M2M": Enabling Device Management and Applications for the Internet of Things, Feb. 26, 2014, Vodafone, Arm and Ericsson, 16 pages.

* cited by examiner

BOOTSTRAPPING WITHOUT TRANSFERRING PRIVATE KEY

RELATED APPLICATION

The present application claims priority to GB Application No. 1513748.2 filed Aug. 3, 2015, which is hereby incorporated herein in its entirety by reference.

TECHNICAL FIELD

The present techniques generally relate to a secure bootstrap mechanism for endpoint devices. In particular, the bootstrap mechanism provides cryptographically secure, transparent proxy services between the large-resource traditional Internet and constrained-resource IP-enabled endpoint devices, without transferring private keys to the endpoint devices.

BACKGROUND ART

The Internet of Things encompasses devices and networks that are IP-enabled and Internet-connected, along with the Internet services monitoring and controlling those devices. Such IP-enabled devices connected to the internet may be termed data processing devices, end nodes, remote devices or Internet of Things (IoT) devices and include sensors, machines, active positioning tags, radio-frequency identification (RFID) readers and building automation equipment to name but a few. Data exchange between programs, computers and Machine-to-Machine (M2M) is a vital element of the Internet of Things and different programs, computers and processors are used in different environments.

The Wireless Embedded Internet is a subset of the Internet of Things and is generally represented by resource-limited embedded devices, often battery powered and connected by low-power, low-bandwidth wireless networks to the Internet.

An example of a network technology where Machine-to-Machine (M2M) communication is widely applied is a low-power wireless network, such as an IEEE 802.15.4 based embedded and sensor network. More recently, as M2M devices have become IP enabled, systems have become more open by using IP as a networking protocol.

Following the introduction of IEEE 802.15.4 other standards were developed to standardize an IP adaption for such wireless embedded links. For example, the IPv6 over Low Power Wireless Standard (6LoWPAN) is a set of standards which enable the efficient use of IPv6 over low-power, low-rate wireless networks on simple embedded devices through an adaption layer and the optimization of related protocols.

The Open Mobile Alliance Lightweight LWM2M is a standard applicable to 6LoWPAN and is focused on constrained cellular and M2M devices. A Lightweight Machine-to-Machine (LWM2M) Bootstrap process is used to provide mandatory information through the Bootstrap Interface for remote devices so that they can perform registration with one or more servers. Registration assigns a remote device to a cloud based server to access applications across a domain. A domain may be a logical grouping of devices and when the domain is exported to Domain Name System (DNS), then the domain value normally equates to the DNS domain name.

The present applicant has recognized the need for an improved, and more secure, bootstrap process to register a M2M device with a server.

BRIEF DESCRIPTION OF THE DRAWINGS

The techniques are diagrammatically illustrated, by way of example, in the accompanying drawings, in which.

DETAILED DESCRIPTION OF THE DRAWINGS

An Internet of Things (IoT) network comprises multiple connected devices and services ('things') with different functionalities. The devices and services may be provided by different parties, and typically, the devices are resource-constrained with limited power supply, communication capability, CPU performance and memory. Generally speaking, bootstrapping processes include some or all of the steps that enable a new device to join a network and to communicate with a machine-to-machine (M2M) server. The bootstrapping processes include alerting a bootstrap server to the presence of a new device in a network, exchanging security credentials and authenticating the new device such that only permitted devices are able to join a network, and generating/distributing key pairs between the M2M server and the new device to enable secure communication between the M2M server and device. Traditional bootstrapping processes place configuration burdens upon end-users, and, for example, require users to input security information or perform other configuration steps to enable a device to connect to a network and perform secure communication.

Broadly speaking, embodiments of the present invention provide an apparatus, system and method for enabling a new 'thing' (e.g. a device) to join an Internet of Things (IoT) network via a more secure bootstrapping process. In particular, embodiments of the present invention avoid the need for a bootstrap server to generate and/or distribute private keys of an asymmetric cryptographic key pair to a device.

One disadvantage of the standard bootstrap process is that a bootstrap server (BS) is configured to generate a public-private key pair and transfer the private key to the joining device. The public-private key pair is used, for example, by a LWM2M server to authenticate the device, and to encrypt/decrypt messages sent between the device and the LWM2M server. This presents a significant security risk, as the private key could be intercepted during transmission from the bootstrap server to the device. Once intercepted, the private key could be used to decrypt data/messages within the network and/or enable rogue, unauthorized devices to connect to the network and LWM2M server. Embodiments of the present invention provide a bootstrapping process to couple a device to an LWM2M server without distributing the private key of an asymmetric key pair.

Figure 1:
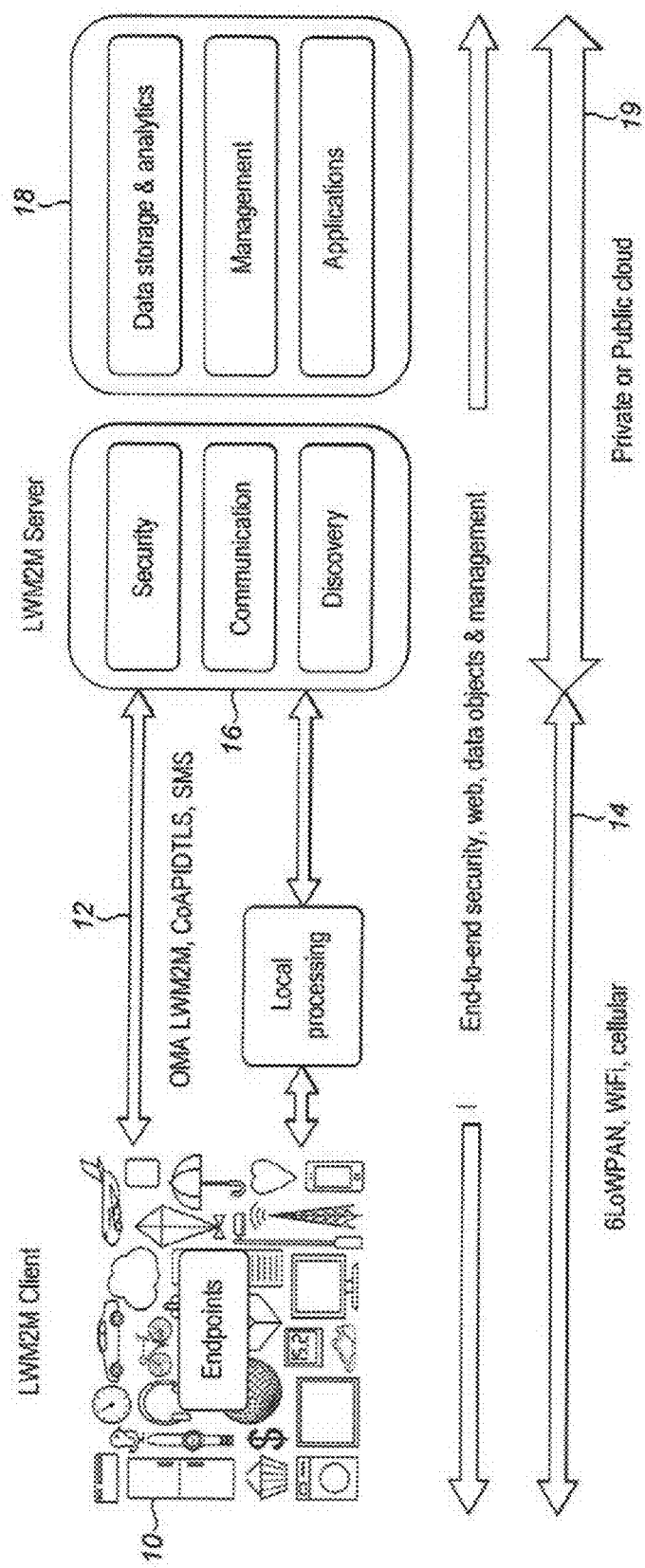
FIG. 1 is a schematic diagram of a LWM2M deployment scenario.

FIG. 1 shows a deployment scenario for an M2M remote device 10 across a range of market segments from streetlights and electric meters to home and building automation. The remote devices 10 may interface 12 with a LWM2M server 16 based on open IETF standards such as Constrained Application Protocol (CoAP) over a low-power wireless network. One such low-power wireless network is an IEEE 802.15.4 based embedded and sensor network using IPv6 over Low Power Wireless Standard (6LoWPAN) 14. The LWM2M server 16 can interface with the wider world-wide web network 18 enabling deployment of M2M applications from a private server, private cloud or public cloud environment 19.

Figure 2:
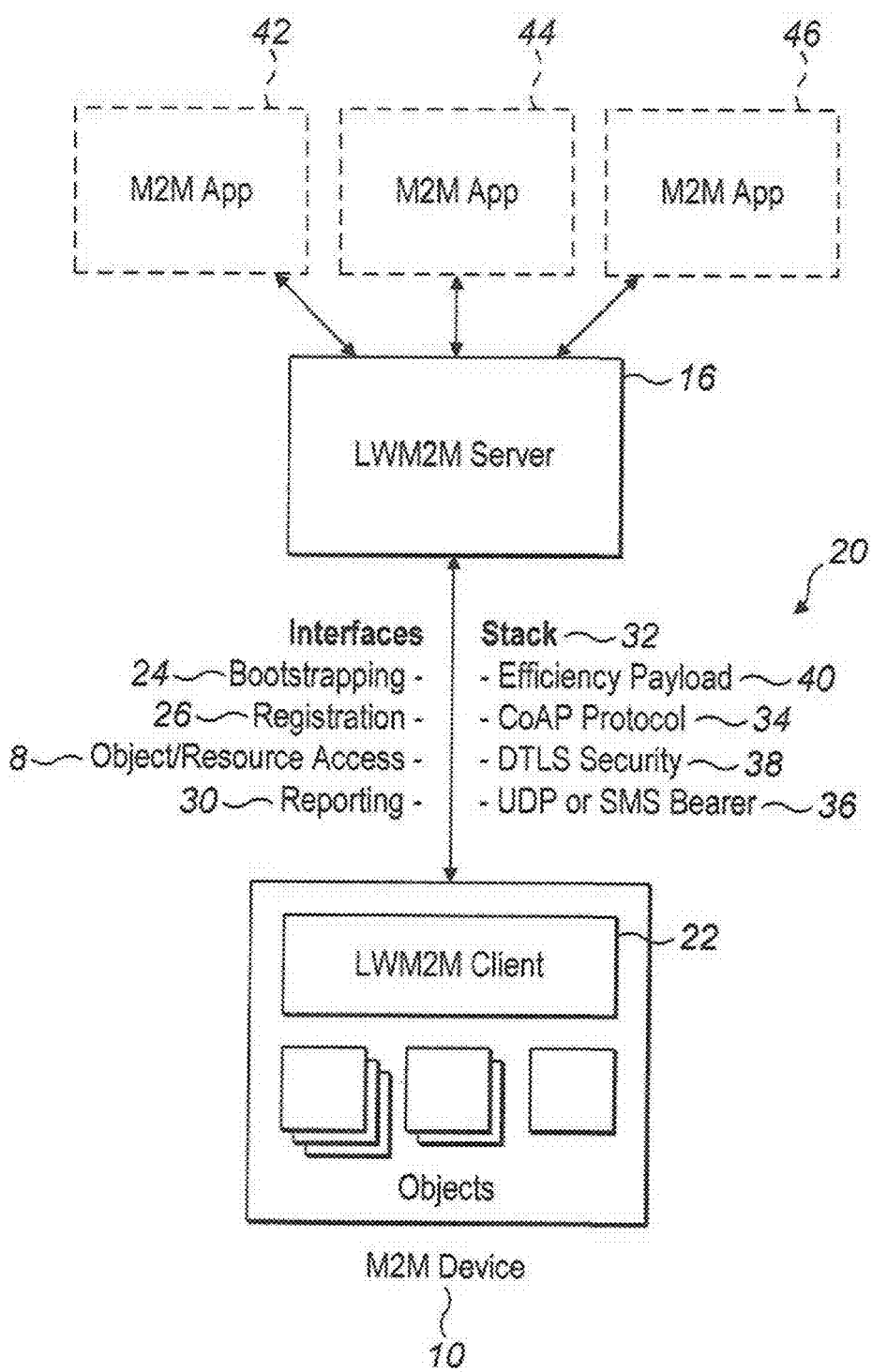
FIG. 2 is a schematic diagram of a LWM2M architecture with Server and Client.
Figure 3:
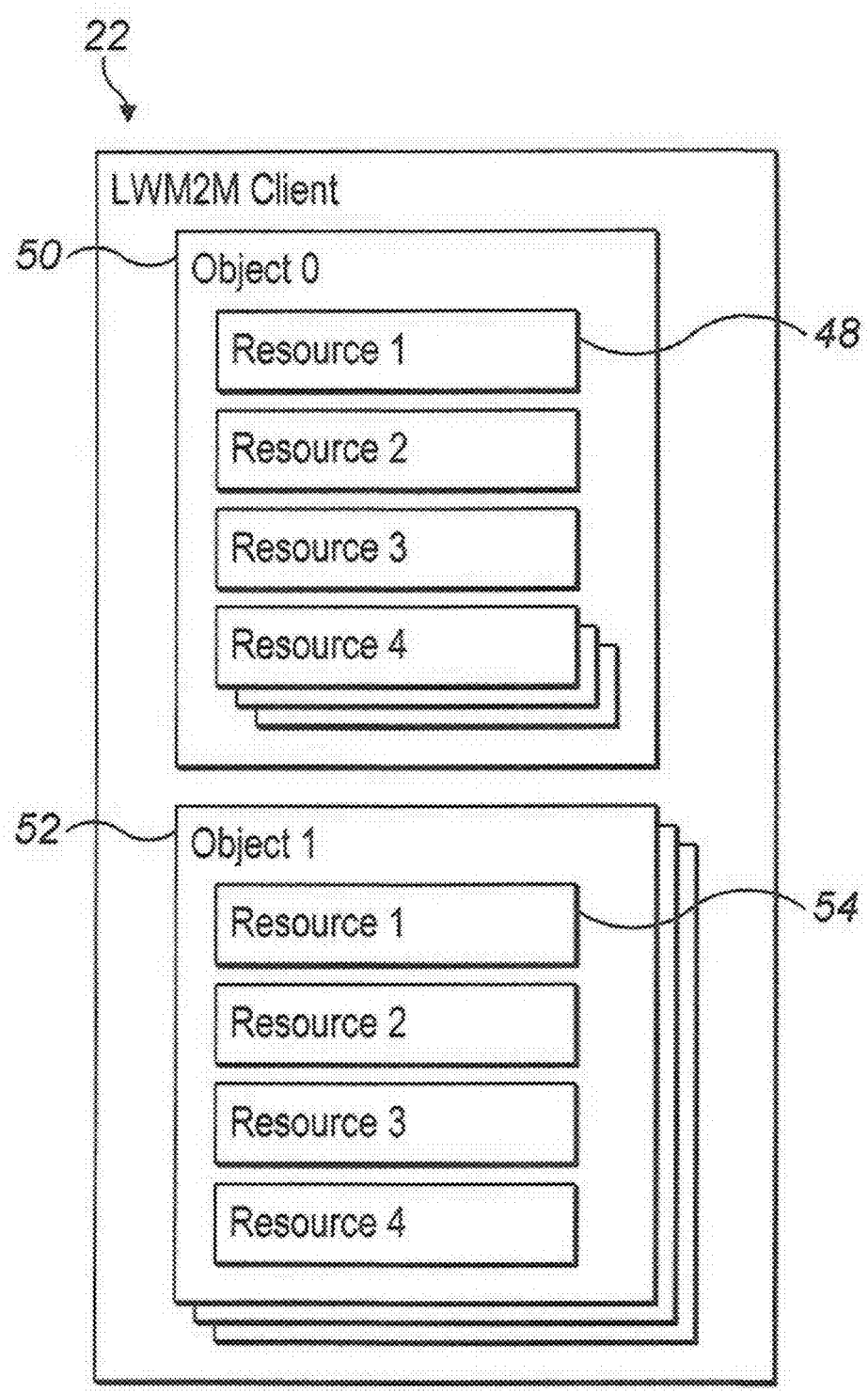
FIG. 3 is a schematic diagram of a LWM2M object model.

FIGS. 2 and 3 show the LWM2M architecture 20 which technically defines the application layer communication protocol for use between a client 22 on the M2M remote device 10 and server software on a LWM2M server 16. The client 22 resides on the device 10 and is integrated as a software library or a built-in function of a module or device 10. The server 16 is located in a private or public data center and can be hosted by the M2M Service Provider, Network Service Provider or Application Service Provider. Four logical interfaces are defined between the server and client, namely bootstrapping 24 being pre-provisioned or client/server initiated; registration 26 to register the client 22 and its objects 50; object/resource access or device management 28 to enable server 16 access to an Object 50 or resource 48; and information reporting 30 for notifications with new resource 48 values.

The LWM2M protocol stack 32 uses the Constrained Application Protocol (CoAP) 34 as the underlying transfer protocol over User Datagram Protocol (UDP) and Short Message Server (SMS) bearers 36. The CoAP protocol 34 defines the message header, request/response codes, message options and retransmission mechanisms. The CoAP protocol 34 is an alternative to HTTP for Representational State Transfer (RESTful) Application Programming Interfaces (APIs) on resource-constrained devices 10 and supports the methods of GET, POST, PUT, DELETE, which can be mapped to those of HTTP. Unlike HTTP, CoAP messages are exchanged asynchronously between CoAP end-points over a datagram-oriented transport such as UDP. CoAP messages are encoded in a binary format allowing functionality to start with a 4-byte overhead. LWM2M defines the UDP Binding with CoAP as mandatory whereas the SMS Binding with CoAP is optional, which in effect means that LWM2M client 22 to server 16 interaction may occur both via SMS and UDP 36.

The LWM2M architecture 20 use security protocols to secure communications between client 22 and server 16 using a Transport Layer Security (TLS) or a Datagram Transport Layer Security (DTLS) 38. DTLS 38 is used to provide a secure channel between the LWM2M server 16 and the LWM2M client 22 for all efficient payloads 40. However, DTLS is merely referred to as an example of a security layer for communications between the client 22 and server 16. Any suitable security layer can be used to secure communications in the network. The efficient payloads 40 can be plain text for individual resources and Binary TLV or JSON for resource batches (Object or Resource Arrays). DTLS 38 security modes include both pre-shared key and public key technology to support embedded devices 10.

M2M application 42 developers can manage the devices 10 remotely through a M2M web application 44 and a M2M device management application 46.

Referring to FIG. 3, the client 22 illustrated in FIG. 2 is shown in more detail. Each piece of information made available by the LWM2M client 22 is a Resource 48. A Resource 48 is a piece of information that can be read, written or executed and is accessed with URIs:

/{Object ID}/{Object Instance]/[Resource ID}, for example /3/0/1 (Device Object, Manufacturer Resource).

The Resources 48 are further logically organized into Objects 50. Each LWM2M client 22 can have any number of Resources 48, each of which belongs to an Object 50. For example, a Firmware Object 52 may contain all the Resources 54 used for firmware update purposes.

Although not shown in FIG. 3, a set of objects for device management purposes include:

Security object to handle security aspects between management servers 16 and the client 22 on the device 10;

Server object to define data and functions related to the management server 16;

Access control object to define for each of several permitted management servers 16 the access rights the servers 16 have for each data object on the client 22;

Device object to detail resources on the M2M device 10 related to device 10 specific information;

Location object to group those resources that provide information about the current location of the M2M device 10;

Connectivity object to group together resources on the M2M device 10 that assist in monitoring the status of a network connection; and Connection statistics object to group together resources on the M2M device 10 that hold statistical information about an existing network connection.

As an example, the device object allows remote retrieval of device information such as manufacturer, model, power information, free memory and error information. Furthermore the device object provides a resource for initiation of a remote reboot or factory reset.

As discussed in more detail with reference to FIGS. 4a and 4b, the LWM2M standard defines a provisioning and bootstrapping 24 functionality that allows the server 16 to manage the keying, access control and configuration of the device 10 to enroll with the server 16. The LWM2M Bootstrap server is used to provide information through the Bootstrap Interface 24 for client 22 so that the client 22 can perform its registration with one or more servers 16. After the bootstrap sequence, the client 22 has a server account and optionally some other object instances such as Access Control or Connectivity Object.

Bootstrapping for complete provisioning and key management may be pre-configured bootstrapping such as from Flash; smart card bootstrapping such as from a SIM card or use of a bootstrap server for initial setup or re-configuration and keying in the modes client-initiated bootstrapping and server-initiated bootstrapping.

Figure 4A:
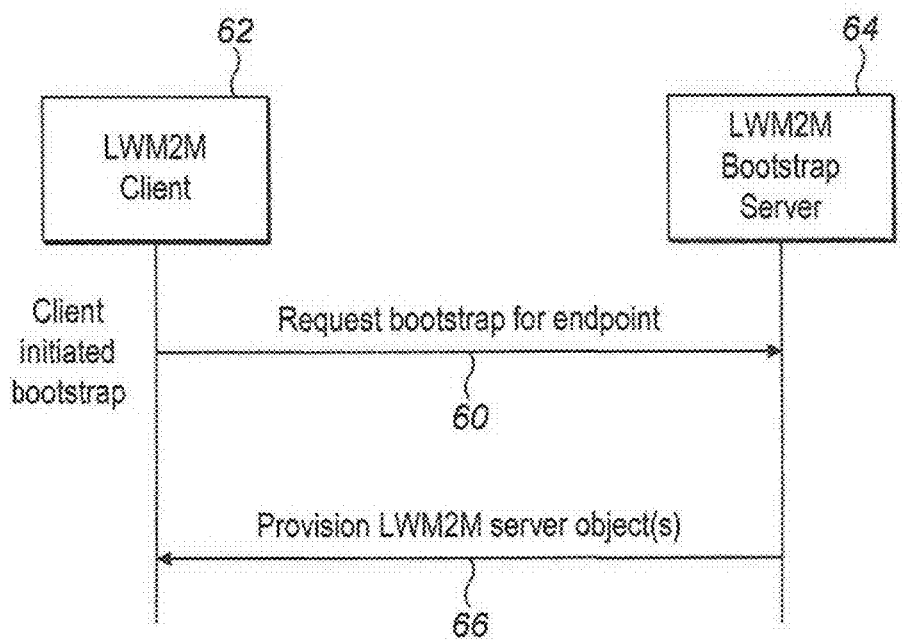
FIG. 4a is a schematic diagram of a client initiated bootstrap.

In its most simplified form, as shown in FIG. 4a, a client initiated bootstrap comprises a request for bootstrap for a remote device step 60 from a LWM2M client 62. In response, a LWM2M bootstrap server 64 provides a provision of LWM2M server objects 66 to the LWM2M client 62. In every case, a bootstrap server 64 gives a device server's information according to OMA LWM2M. At minimum, the IP address and security mode of the device server.

Figure 4B:
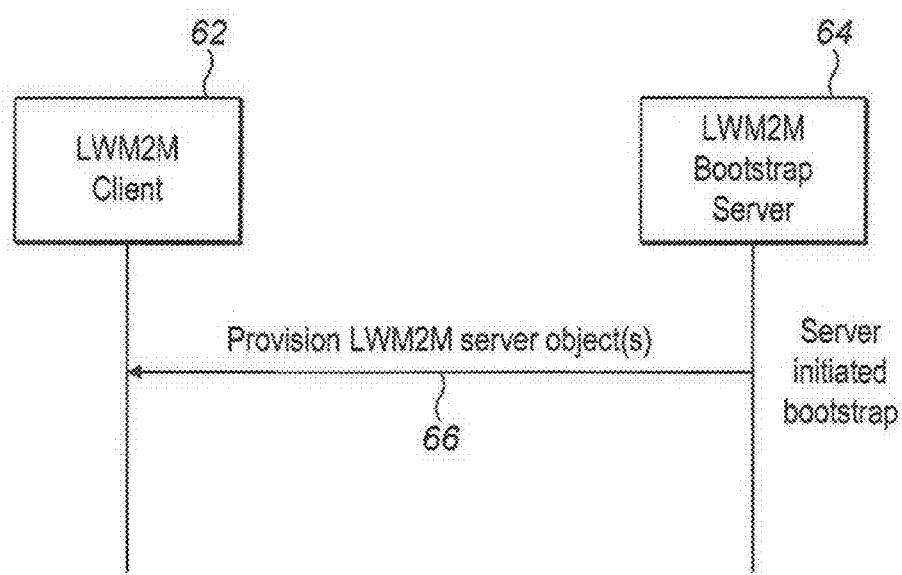
FIG. 4b is a schematic diagram of a server initiated bootstrap.

Referring to FIG. 4b a server initiated bootstrap comprises a provision of LWM2M server objects 66 only from LWM2M bootstrap server 64 to LWM2M client 62.

A remote device may be pre-provisioned with information of an assigned server or it may receive information of an assigned server as part of the bootstrapping process. In either case it may be desirable to assign a remote device to another server so that the remote device will register with that different cloud based server. The another server may be in addition to, or in place of, the first server.

In both these cases, prior art techniques require that the bootstrap server needs to be able to connect to the remote device in order to provision the remote device with new information including at least the address of the another server.

As outlined above, the bootstrap process enables a new device to join an Internet of Things (IoT) network and to communicate with a machine-to-machine (M2M) server. The bootstrapping processes include alerting a bootstrap server to the presence of a new device in a network, exchanging security credentials and authenticating the new device such that only permitted devices are able to join a network, and generating/distributing key pairs between the M2M server and the new device to enable secure communication between the M2M server and device. One disadvantage of the standard bootstrap process is that a bootstrap server (BS) is configured to generate a public-private key pair and transfer the private key to the joining device. The public-private key pair is used, for example, by a LWM2M server to authenticate the device, and to encrypt/decrypt messages sent between the device and the LWM2M server. This presents a significant security risk, as the private key could be intercepted during transmission from the bootstrap server to the device.

The embodiments illustrated in FIGS. 5 to 9 provide solutions to this security problem, thereby providing a more secure bootstrapping process. Throughout the following description, like references shall be used to describe like parts and process steps. Broadly speaking, the embodiments and techniques described with reference to FIGS. 5 to 9 solve the above-mentioned security problem by avoiding the need to generate and distribute the private key of an asymmetric cryptographic key pair. The solutions described with reference to FIGS. 5 to 9 broadly provide a bootstrap process to register a remote device (client) with a bootstrap server using a public key associated with (attributed to) the device. The process comprises determining an availability and address of the remote device on a network for communication with the server; obtaining a public key attributed to the remote device; signing the public key attributed to the remote device with a private key of the server and so generating a digitally signed certificate to verify the ownership of the public key as the remote device; and transmitting the digitally signed certificate to the remote device. In specific embodiments, the remote device uses the digitally signed public key certificate to communicate with, and authenticate itself to, a LWM2M server in an IoT network.

According to a first aspect of the present invention, there is provided a machine implemented method of secure bootstrap communication between server and remote device, the method comprising: determining an availability and address of the remote device on a network for communication with the server; obtaining a public key attributed to the remote device; signing the public key attributed to the remote device with a private key of the server and so generating a digitally signed certificate to verify the ownership of the public key as the remote device; and transmitting the digitally signed certificate to the remote device.

In embodiments, prior to authenticating between the remote device and server, the remote device is provisioned with a stored private key at the remote device, the private key forming an asymmetric key pair with the public key attributed to the remote device.

According to a second aspect of the present invention, there is provided an apparatus for receiving a bootstrap request from a remote device, the hardware apparatus comprising: an input for receiving a bootstrap request from the remote device, wherein the bootstrap request comprises an address of the remote device; a processor configured to: extract the address of the remote device from the received bootstrap request; obtain a public key attributed to the remote device; and create a digitally signed certificate to verify the owner of the public key as the remote device, wherein the digitally signed certificate is created by signing the public key with a private key of the apparatus; and communication circuitry configured to transmit the digitally signed certificate to the remote device using the extracted address.

The following features apply to both aspects.

In embodiments, the remote device begins an authentication (bootstrap) process with the server and as a step of the authentication process indicates to the server that the stored public key of the remote device should be used by the server.

In embodiments, the remote device begins an authentication process with the server and provides in a payload its stored public key to the server.

Figure 5:
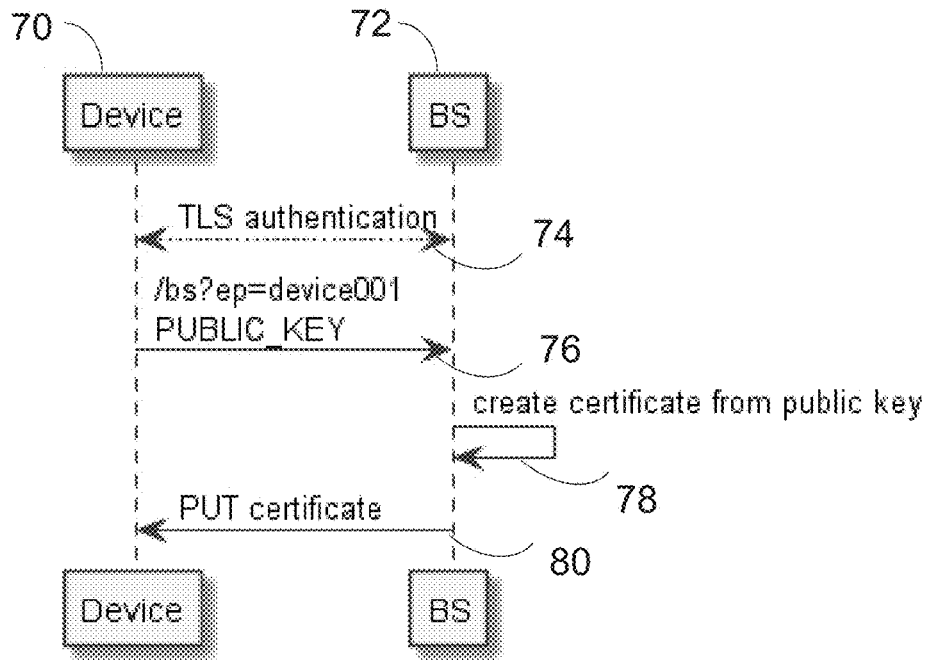
FIG. 5 is a schematic diagram of a client-initiated bootstrap process to register a device (client) with a LWM2M server using a public key broadcast by the device.

Turning now to FIG. 5, this shows a schematic diagram of a client-initiated bootstrap process to register a remote device 70 (client) with a bootstrap server 72 using a public key associated with (attributed to) the device, according to a first embodiment of the present invention.

Here, the (remote) device 70 first authenticates itself with a bootstrap server (BS) 72 in a network. The device 70 and bootstrap server 72 use the Transport Layer Security (TLS) cryptographic protocols to authenticate each other (step 74) and agree upon cryptographic keys to use to encrypt/decrypt data sent from the device 70. Under the TLS protocol, the device 70 typically sends a message to the bootstrap server 72, and the bootstrap server 72 responds with information to authenticate itself. The TLS protocol specifies a well-defined handshake sequence for the device 70 and bootstrap server 72 to agree upon the keys they will use to encrypt communications. The TLS handshake is performed using public key cryptography, which allows the device 70 and bootstrap server 72 to negotiate a shared secret key without having to establish prior knowledge of each other, and to do so over an unencrypted (and therefore, unsecure) communication channel.

The TLS protocol is one of a number of authentication protocols available such as Transport Layer Security (TLS), Secure Sockets Layer (SSL) and the Private Communications Transport (PCT) are based on public key cryptography.

In FIG. 5, the remote device 70 is manufactured with a private key embedded in a very secure, read-only space (not shown) within the device 70. As part of the authentication process, the device 70 transmits a new public key to the bootstrap server 72 (step 76), rather than the public key used during the TLS authentication. The new public key forms the public part of an asymmetric key pair, while the private part is provided by the private key embedded within the device.

The bootstrap server 72 uses this newly provided public key to create a signed digital certificate (step 78). The digital certificate is a public key certificate and is used to prove ownership of the public key (as belonging to the device 70), and to provide data identifying the bootstrap server 72 as the issuer of the certificate. The digitally signed public key certificate comprises the public key provided by the remote device 70, which has been signed with a private key of the bootstrap server 72. In doing so, the bootstrap server 72 has generated a certificate verifying the owner of the public key as the remote device 70. The digitally signed certificate can be verified by anyone or anything having access to the bootstrap server's public key. However, the bootstrap server 72 transmits a copy of the certificate to the device 70 (step 80) without the private key corresponding to the remote device's public key, since the device 70 already knows the private key. The device 70 stores a copy of this signed digital certificate. The device 70 and bootstrap server 72 are ready to securely communicate with each other, and the device 70 can also use this signed digital certificate to authenticate itself to a LWM2M server. Importantly, the private key of the device's public-private key pair is not generated and transmitted by the bootstrap server 72 to the device 70, and thus, the overall security of transmissions between bootstrap server 72 and device 70 is improved.

Figure 6:
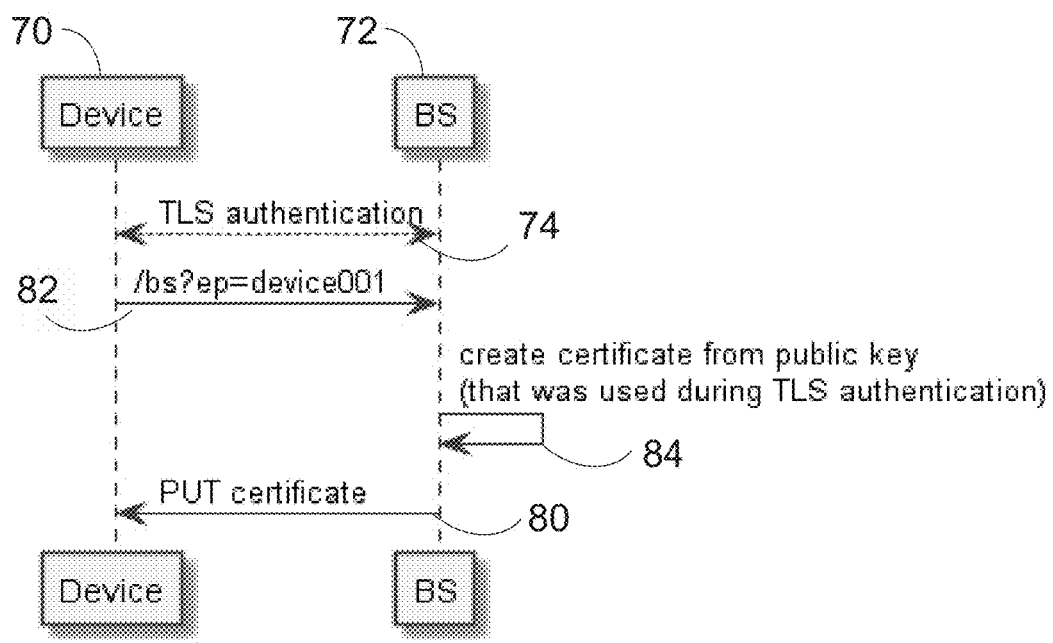
FIG. 6 is a schematic diagram of a client-initiated bootstrap process to register a device (client) with a LWM2M server using a device public key obtained after mutual authentication of the server and device.

FIG. 6 is a schematic diagram of a client-initiated bootstrap process to register a device 70 (client) with a LWM2M server using a public key obtained after mutual authentication of the bootstrap server 72 and device, according to a second embodiment of the present invention. Here, once the TLS authentication process has completed (step 74), the device 70 transmits a public key to the bootstrap server 72 (step 82) which is the same public key used during the TLS authentication.

In embodiments, the remote device begins an authentication process with the bootstrap server 72 and as a step of the authentication process indicates to the bootstrap server 72 that the stored public key of the remote device 70 should be used by the server. Additionally or alternatively, the remote device 70 begins an authentication process with the bootstrap server 72 and provides in a payload its stored public key to the server.

Similar to FIG. 5 above, in FIG. 6 the public key provided by the device 70 forms the public part of an asymmetric key pair, while the private part is provided by the private key embedded within the device. The bootstrap server 72 uses the public key used during the TLS handshake process to create a signed certificate (step 84). The public key certificate (digital certificate) is used to prove ownership of the public key and to provide data identifying the certificate issuer (bootstrap server 72). The digital certificate is digitally signed using the bootstrap server's private key, such that the certificate can be verified by anyone who has access to the server's public key. However, the bootstrap server 72 transmits a copy of the certificate to the device 70 (step 80) without the corresponding device private key, since the device 70 already knows the corresponding device private key. The device 70 stores a copy of this signed digital certificate, and the device 70 and bootstrap server 72 are ready to securely communicate with each other. Importantly, the private key of the public-private key pair is not generated and transmitted by the bootstrap server 72 to the device 70, and thus, the overall security of transmissions between bootstrap server 72 and device 70 is improved.

FIGS. 5 and 6 describe embodiments of client-initiated bootstrap processes. Server-initiated bootstrap processes are now described with reference to FIGS. 7 to 9. In a server-initiated bootstrap process, the bootstrap server (BS) 72 is alerted to the existence of a new device 70 in a network by a remote resource 86. The bootstrap server 72 can be alerted/notified to the presence of the new device 70 by any elements/remote resources coupled to, or capable of communicating with, the device 70. For example, the notification may be provided to the bootstrap server 72 by any one or more of the following elements: a Network Access Server (NAS), which enables a client to couple to a network (e.g. the Internet); a home location register (HLR), which stores details of every SIM card issued by a mobile phone operator; a home subscriber server (HSS) which holds subscription-related information for users/devices; a mobile switching center (MSC), a visitor location register (VLR) which is a database of the subscribers who have roamed into the jurisdiction of the MSC that it serves; and/or an authentication, authorization and accounting (AAA) server, which interacts with network access and gateway servers and databases containing user information. The examples described below refer to a NAS, but the skilled person will understand that the bootstrap server can be notified of the presence of a new device 70 by any suitable resource within its network.

In embodiments, the (bootstrap) server 72 obtains the public key attributed to the remote device 70 and the address of the remote device 70 from a remote resource 86 and begins an authentication process with the remote device.

Additionally or alternatively, the bootstrap server 72 obtains the address of the remote device 70 from a remote resource 86 and begins an authentication process with the remote device. In particular embodiments, the remote device 70 indicates to the bootstrap server 72 that the stored public key of the remote device 70 should be used by the server. In additional or alternative embodiments, the remote device 70 provides in a payload its stored public key to the server.

Figure 7:
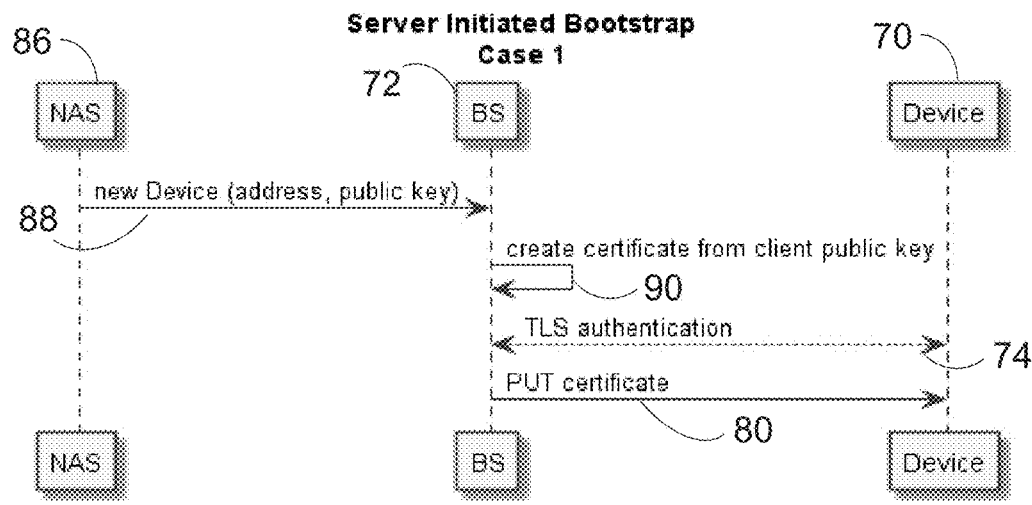
FIG. 7 is a schematic diagram of a server-initiated bootstrap process to register a device with a LWM2M server using the device (client) public key broadcast by the device.

FIG. 7 is a schematic diagram of a server-initiated bootstrap process to register a device 70 with a LWM2M server using the device (client) public key broadcast by the device, according to a third embodiment of the present invention. The device 70 broadcasts data about itself in the process to join a network, where this data includes the (IP) address of the device 70. The Network Access Server (NAS) 86 (or any other suitable remote resource) receives this broadcast data and determines that the device 70 is a new device attempting to join the network. In the embodiment depicted in FIG. 7, the device 70 also broadcasts its public key. The NAS 86 transmits the received data (the device's address and public key) to the bootstrap server (BS) 72 (step 88). The bootstrap server 72 uses this data, and in particular the public key of the device 70, to create a digitally signed certificate (step 90).

The public key provided by the device 70 forms the public part of an asymmetric key pair, while the private part is provided by the private key embedded within the device. The bootstrap server 72 uses this broadcast public key to create a signed public-key certificate (step 90), to prove ownership of the public key and to provide data identifying the certificate issuer (bootstrap server 72). The digital certificate is digitally signed using a private key, such that the certificate can be verified by anyone who has access to the server's public key.

The bootstrap server 72 attempts to register the device 70 in the network (step 74) and begins an authentication process. The device 70 and bootstrap server 72 use the Transport Layer Security (TLS) cryptographic protocols to authenticate each other (step 74) and agree upon cryptographic keys to use to encrypt data sent between the bootstrap server 72 and the device. (This process is described above with reference to FIGS. 5 and 6.)

The device 70 is manufactured with a private key embedded in a very secure, read-only space within the device. Once the TLS authentication process has been completed, the bootstrap server 72 transmits the (or a copy of the) signed public key certificate to the device 70 (step 80) without the corresponding private key, since the device 70 already knows the private key. The device 70 stores a copy of this signed digital certificate. The device 70 and bootstrap server 72 are ready to securely communicate with each other. The device 70 can additionally or alternatively use this signed digital certificate to authenticate itself to a LWM2M server. As in the above-described examples, the private key of the device's public-private key pair is not generated and transmitted by the bootstrap server 72 to the device 70, and thus, the overall security of transmissions between server 72 and device 70 is improved.

Figure 8:
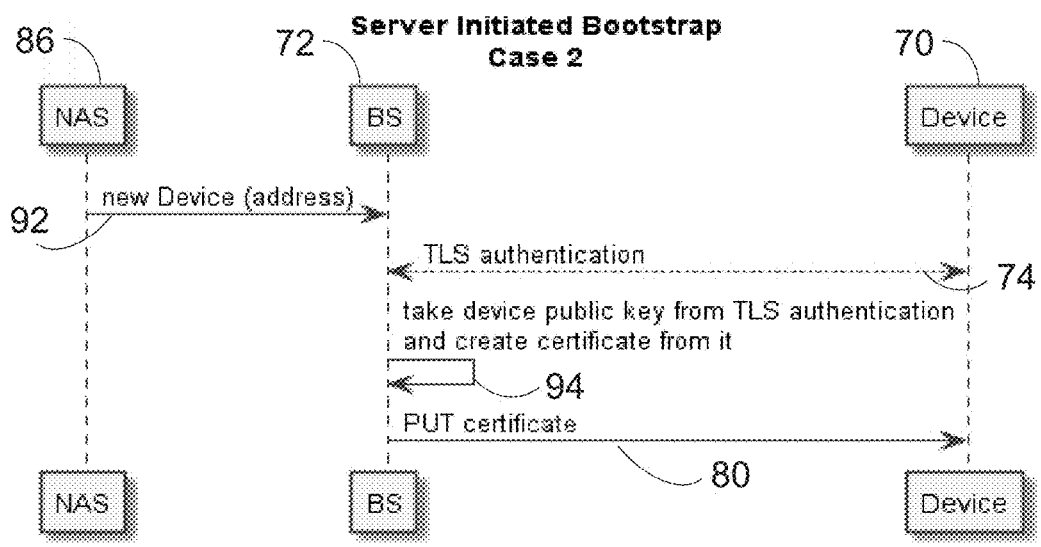
FIG. 8 is a schematic diagram of a server-initiated bootstrap process to register a device with a LWM2M server using the device (client) public key obtained after mutual authentication of the server and device.

A fourth embodiment of the present invention is shown in FIG. 8, which depicts a schematic diagram of a server-initiated bootstrap process to register a device 70 with a LWM2M server using the device (client) public key obtained after mutual authentication of the bootstrap server 72 and device 70. Here, the device 70 does not broadcast its public key in addition to its (IP) address. The NAS 86 receives at least address data from the device 70 (but not the public key) and transmits this to the bootstrap server 72 (step 92). In comparison to the embodiment of FIG. 7, the bootstrap server 72 in FIG. 8 does not know what public key should be used to create a digital certificate. Thus, the bootstrap server 72 attempts to first register the device 70 in the network (step 74), before creating the certificate.

The device 70 and bootstrap server 72 use the Transport Layer Security (TLS) cryptographic protocols to authenticate each other (step 74) and agree upon cryptographic keys to use to encrypt data sent between the bootstrap server 72 and the device 70. (This process is described above with reference to FIGS. 5 and 6.)

The device 70 is manufactured with a private key embedded in a very secure, read-only space within the device. Once the TLS authentication process has been completed (step 74), the bootstrap server 72 uses the public key used during the TLS handshake process to create a signed certificate (step 94). The public key certificate (digital certificate) is used to prove ownership of the public key and to provide data identifying the certificate issuer (bootstrap server 72). The digital certificate is digitally signed using the server's private key, such that the certificate can be verified by anyone who has access to the server's public key. However, the bootstrap server 72 transmits a copy of the public-key certificate to the device 70 (step 80) without the private key, since the device 70 already knows its own corresponding private key. The device 70 stores a copy of this signed digital certificate. The device 70 and server 72 are ready to securely communicate with each other. The device 70 can additionally or alternatively use this signed digital certificate to authenticate itself to a LWM2M server. As in the above-described examples, the private key of the device's public-private key pair is not generated and transmitted by the bootstrap server 72 to the device 70, and thus, the overall security of transmissions between server 72 and device 70 is improved.

In a particular arrangement, the bootstrap server 72 obtains the address of the remote device 70 from a remote resource and begins an authentication process with the remote device, and as part of the authentication process, the bootstrap server 72 automatically obtains the stored public key of the remote device 70 from a predetermined location. This example is described with reference to FIG. 9.

Figure 9:
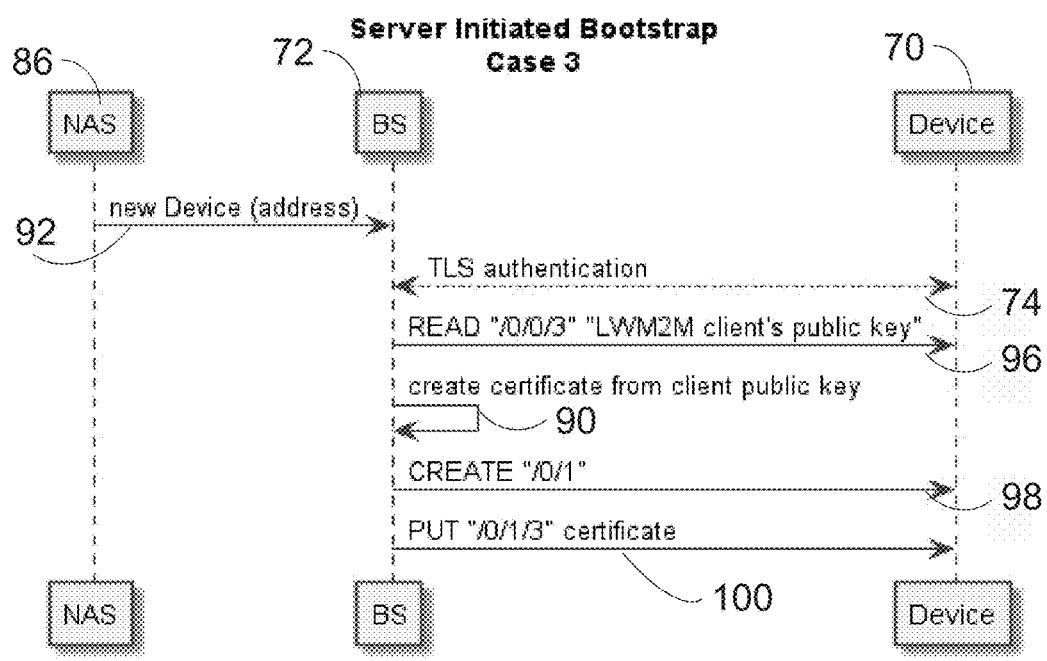
FIG. 9 is a schematic diagram of a server-initiated bootstrap process to register a device with a LWM2M server by reading the device (client) public key from the device.

FIG. 9 is a schematic diagram of a server-initiated bootstrap process to register a device 70 with a LWM2M server by reading the device (client) public key from the device, according to a fifth embodiment of the present invention. Here, the device 70 does not broadcast its public key in addition to its (IP) address. The NAS 86 receives at least address data from the device 70 (but not the public key) and transmits this to the bootstrap server 72 (step 92). As per the embodiment described with reference to FIG. 8, the bootstrap server 72 attempts to first register the device 70 in the network (step 74), before creating the certificate.

Once the TLS authentication process has been completed (step 74), the bootstrap server 72 reads the public key from the device 70 itself (step 96). The public key is stored in the device 70 in a pre-determined read-only space within the device 70, or is accessible via a pre-determined Uniform Resource Identification (URI). In some embodiments, reading the public key from the device 70 directly means that the bootstrap server 72 may not need to store the public key for each device 70 with which it communicates, but can fetch the public key as and when required from the device. In embodiments, the predetermined location is a READ 0/0/3 location within the device 70.

The bootstrap server 72 uses the public key read from the device 70 or obtained via a URI to create a signed certificate (step 90). The public key certificate (digital certificate) is used to prove ownership of the public key and to provide data identifying the certificate issuer (bootstrap server 72). The digital certificate is digitally signed using the bootstrap server's private key, such that the certificate can be verified by anyone who has access to the server's public key. The bootstrap server 72 creates a memory location/address where the digital certificate is to be stored within the device 70, which may be a 0/1 location (step 98). The bootstrap server 72 then transmits a copy of the public-key certificate to the device 70 (step 100) without the corresponding private key, since the device 70 already knows the private key. The device 70 stores a copy of this signed digital certificate in the location defined by the bootstrap server 72.

In each of the examples described above with reference to FIGS. 5 to 9, the remote device 70 may broadcast its availability to initiate an authentication process to a network upon which the remote resource is a node.

In embodiments, the remote device 70 generates its own public/private key pair and the generated private key is encrypted in a secure local memory storage on the remote device.

In embodiments, the remote device 70 receives the digitally signed certificate and stores the digital signed certificate for use as its digitally signed certificate public key.

Additionally or alternatively, the remote device 70 transmits the digitally signed certificate public key to a node in the network. In particular embodiments, the node is a LWM2M server. The LWM2M server may use the digitally signed certificate public key to authenticate the remote device.

In one or more of the embodiments shown in FIGS. 5 to 9, the server and/or apparatus described above is a LWM2M bootstrap server.

In embodiments, the remote device 70 is an Internet of Things (IoT) device.

In embodiments, the apparatus processor is further configured to: use the extracted address of the remote device 70 to locate and communicate with the remote device; and automatically obtain the public key attributed to the remote device 70 from a predetermined location within the remote device.

In a related aspect, embodiments of the present invention provide a system for enabling communication between server and remote device, the system comprising: at least one remote device 70 associated with a public key; an apparatus for receiving a bootstrap request from the at least one remote device, as described herein; and a server; wherein the apparatus is configured to: sign the public key associated with the remote device 70 with a private key of the apparatus and so generate a digitally signed certificate to verify the ownership of the public key as the remote device; and transmit the digitally signed certificate to the remote device; wherein the remote device 70 is configured to: receive the digitally signed certificate from the apparatus; store the digitally signed certificate for use as its digitally signed public key certificate; and transmit the digitally signed public key certificate to the server; and wherein the server is configured to: receive the digitally signed public key certificate from the remote device; and use the received digitally signed public key certificate to authenticate the remote device.

In a further related aspect, embodiments of the present invention provide a non-transitory data carrier carrying code which, when implemented on a processor, causes the processor to carry out the method described herein.

Embodiments of the invention further provide processor control code to implement the above-described systems and methods, for example on a general purpose computer system or on a digital signal processor (DSP). Embodiments also provide a carrier carrying processor control code to, when running, implement any of the above methods, in particular on a non-transitory data carrier—such as a disk, microprocessor, CD- or DVD-ROM, programmed memory such as read-only memory (firmware), or on a data carrier such as an optical or electrical signal carrier. The code may be provided on a carrier such as a disk, a microprocessor, CD- or DVD-ROM, programmed memory such as non-volatile memory (e.g. Flash) or read-only memory (firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As a skilled person in the art will appreciate, such code and/or data may be distributed between a plurality of coupled components in communication with one another. Embodiments may comprise a controller which includes a microprocessor, working memory and program memory coupled to one or more of the components of the system.

Those skilled in the art will appreciate that while the foregoing has described what is considered to be the best mode and where appropriate other modes of performing embodiments of the invention, the present invention should not be limited to the specific configurations and methods disclosed in this description of the preferred embodiment. Those skilled in the art will recognize that present embodiments have a broad range of applications, and that the embodiments may take a wide range of modifications without departing from the any inventive concept as defined in the appended claims.

The invention claimed is:

1. A machine implemented method of bootstrap communication between server and remote device, the method comprising:
   determining an availability to initiate an authentication process and determining an address of the remote device on a network for communication with the server;
   authenticating the remote device with the server;
   obtaining a public key stored on the remote device;
   signing the public key stored on the remote device with a private key of the server and so generating a digitally signed certificate to verify the ownership of the public key as the remote device; and
   transmitting the digitally signed certificate to the remote device at which a private key is stored, the public key and the private key being part of an asymmetric key pair.

2. The method of claim 1, wherein the remote device begins the authentication process with the server and as a step of the authentication process indicates to the server that the stored public key of the remote device should be used by the server.

3. The method of claim 1, wherein the remote device begins the authentication process with the server and provides in a payload its stored public key to the server.

4. The method of claim 1, wherein the server obtains the public key attributed to the remote device and the address of the remote device from a remote resource and begins the authentication process with the remote device.

5. The method of claim 1, wherein the server obtains the address of the remote device from a remote resource and begins the authentication process with the remote device.

6. The method of claim 5, wherein as a step of the authentication process the remote device indicates to the server that the stored public key of the remote device should be used by the server.

7. The method of claim 5, wherein as a step of the authentication process the remote device provides in a payload its stored public key to the server.

8. The method of claim 5, wherein as a step of the authentication process the server automatically obtains the stored public key of the remote device from a predetermined location at the remote device.

9. The method of claim 8, wherein the predetermined location is a Uniform Resource Identification (URI) or is at a READ 0/0/3 location.

10. The method of claim 5, wherein the remote device broadcasts its availability to initiate the authentication process to a network upon which the remote resource is a node.

11. The method of claim 1, wherein the remote device generates its own public/private key pair and the generated private key is encrypted in a secure local memory storage on the remote device.

12. The method of claim 1, wherein the remote device receives the digitally signed certificate and stores the digital signed certificate for use as its digitally signed certificate public key.

13. The method of claim 1, wherein the remote device transmits the digitally signed certificate public key to a node in the network.

14. The method of claim 13, wherein the node is a LWM2M server and uses the digitally signed certificate public key to authenticate the remote device.

15. An apparatus for receiving a bootstrap request from a remote device, the hardware apparatus comprising:

an input for receiving a bootstrap request from the remote device, wherein the bootstrap request comprises an address of the remote device;
a processor configured to:
   authenticate the remote device;
   extract the address of the remote device from the received bootstrap request;
   obtain a public key stored on the remote device; and
   create a digitally signed certificate to verify the owner of the public key as the remote device, wherein the digitally signed certificate is created by signing the public key with a private key of the apparatus; and
communication circuitry configured to transmit the digitally signed certificate to the remote device using the extracted address;
wherein the bootstrapping occurs without transferring a private key from the remote device, by utilizing the remote device comprising a private key at which the private key is stored, the public key and the private key being part of an asymmetric key pair.

16. The apparatus as claimed in claim 15 wherein the processor is further configured to obtain the public key attributed to the remote device and the address of the remote device from a remote resource.

17. The apparatus as claimed in claim 15 wherein the processor is further configured to:
   use the extracted address of the remote device to locate and communicate with the remote device; and
   automatically obtain the public key attributed to the remote device from a predetermined location within the remote device.

18. A system for enabling communication between server and remote device, the system comprising:
   at least one remote device associated with a public key;
   an apparatus for receiving a bootstrap request from the at least one remote device, as described in claim 17; and
   a server;
   wherein the apparatus is configured to:
      sign the public key associated with the remote device with a private key of the apparatus and so generate a digitally signed certificate to verify the ownership of the public key as the remote device; and
      transmit the digitally signed certificate to the remote device;
   wherein the remote device is configured to:
      receive the digitally signed certificate from the apparatus;
      store the digitally signed certificate for use as its digitally signed public key certificate; and
      transmit the digitally signed public key certificate to the server; and
   wherein the server is configured to:
      receive the digitally signed public key certificate from the remote device; and
      use the received digitally signed public key certificate to authenticate the remote device.

* * * * *